United States Patent
Furuya

(10) Patent No.: US 10,209,919 B2
(45) Date of Patent: Feb. 19, 2019

(54) STORAGE CONTROL APPARATUS AND SYSTEM FOR COPYING DATA TO REMOTE LOCATIONS

(71) Applicant: FUJITSU LIMITED, Kawasaki-shi, Kanagawa (JP)

(72) Inventor: Masanori Furuya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/090,663

(22) Filed: Apr. 5, 2016

(65) Prior Publication Data

US 2016/0320975 A1    Nov. 3, 2016

(30) Foreign Application Priority Data

May 1, 2015   (JP) .................................. 2015-094021

(51) Int. Cl.
*G06F 12/00*   (2006.01)
*G06F 3/06*   (2006.01)

(52) U.S. Cl.
CPC ............ *G06F 3/065* (2013.01); *G06F 3/0619* (2013.01); *G06F 3/0689* (2013.01)

(58) Field of Classification Search
CPC ....... G06F 3/065; G06F 3/0689; G06F 3/0619
See application file for complete search history.

(56) References Cited

U.S. PATENT DOCUMENTS

| | | | | |
|---|---|---|---|---|
| 5,049,881 A * | 9/1991 | Gibson | ............... | H03M 7/3086 341/51 |
| 8,914,457 B2 * | 12/2014 | Ban | ..................... | G06F 12/0813 709/213 |
| 9,323,758 B1 * | 4/2016 | Stacey | .............. | G06F 17/30156 |
| 2008/0059735 A1 | 3/2008 | Emaru et al. | | |
| 2009/0254507 A1 | 10/2009 | Hosoya et al. | | |
| 2010/0293142 A1 * | 11/2010 | Ackerman | .............. | H04L 67/06 707/640 |

(Continued)

FOREIGN PATENT DOCUMENTS

| | | |
|---|---|---|
| JP | 2008-65425 | 3/2008 |
| JP | 2009-251725 | 10/2009 |

(Continued)

OTHER PUBLICATIONS

Japanese Office Action dated Nov. 13, 2018 for corresponding Japanese Patent Application No. 2015-094021, with English Translations, 6 pages.

*Primary Examiner* — Tuan V Thai
*Assistant Examiner* — Tasnima Matin
(74) *Attorney, Agent, or Firm* — Fujitsu Patent Center

(57) ABSTRACT

A storage system is able to perform an operation of remote copy from a first storage apparatus to a second storage apparatus. A first control unit transfers summary information of copy target data stored in the first storage apparatus from the first storage apparatus to the second storage apparatus. A second control unit checks the summary information against information stored in the second storage apparatus. The second control unit transfers the checked result from the second storage apparatus to the first storage apparatus. If the checked result indicates matching discrepancy, the first control unit transfers the copy target data to the second storage apparatus and completes the remote copy operation.

10 Claims, 14 Drawing Sheets

(56) References Cited

U.S. PATENT DOCUMENTS

| | | | | |
|---|---|---|---|---|
| 2011/0225209 A1* | 9/2011 | Volvovski | ........... | G06F 12/0646 |
| | | | | 707/803 |
| 2013/0275708 A1* | 10/2013 | Doi | ..................... | H04L 63/1425 |
| | | | | 711/165 |
| 2014/0149476 A1* | 5/2014 | Kishimoto | ............ | G06F 3/0613 |
| | | | | 707/827 |
| 2014/0222945 A1* | 8/2014 | Noronha | ................. | G06F 12/02 |
| | | | | 709/212 |
| 2016/0320975 A1* | 11/2016 | Furuya | .................... | G06F 3/065 |

FOREIGN PATENT DOCUMENTS

| | | |
|---|---|---|
| JP | 2014-511129 A | 5/2014 |
| WO | 2013/081637 A2 | 6/2013 |

\* cited by examiner

STORAGE CONTROL APPARATUS AND SYSTEM FOR COPYING DATA TO REMOTE LOCATIONS

CROSS-REFERENCE TO RELATED APPLICATION

This application is based upon and claims the benefit of priority of the prior Japanese Patent Application No. 2015-094021, filed on May 1, 2015, the entire contents of which are incorporated herein by reference.

FIELD

The embodiments discussed herein are related to a storage control apparatus and a storage system.

BACKGROUND

Data deduplication is used as a technique for reducing disk capacity requirements in storage apparatuses (RAID, or Redundant Arrays of Independent Disks). One known deduplication function is, for example, to compare data written by a server on a block-by-block basis, and assign the same reference destination if the same data patterns are identified and then hold the data in a disk.

Another known technique is a remote copy function for duplicating data between storage apparatuses to thereby implement mirroring or backup services. In the case of creating a remote copy between the storage apparatuses, deduplicated data is transferred with desired part of a virtual volume defined as the target of the remote copy. Thus, by transferring such deduplicated data stored in a storage pool, the remote copy operation is able to reduce the amount of data transfer.

See, for example, Japanese Laid-open Patent Publication Nos. 2009-251725 and 2008-65425.

However, in the case where a storage device defines deduplicated data in a storage pool as a transfer target, all already allocated blocks in the storage pool are subject to a copy operation. For this reason, such a remote copy operation includes virtual volumes not needed to be backed up as its transfer targets. Therefore, the remote copy operation involves an undesirable increase in the amount of data transfer when there is a lot of data not needed to be backed up. In addition, this remote copy operation causes a copy-destination storage apparatus to consume the same storage space in its storage pool as to a copy-source storage apparatus.

On the other hand, if a part of or the whole virtual volume is allowed to be defined as the transfer target in a remote copy operation, control will be achieved in both the amount of data transfer and the storage space needed to be secured in the storage pool of the copy-destination storage apparatus. However, the remote copy operation defining the virtual volume as the transfer target deals with undeduplicated data deployed in the virtual volume as its transfer target. Therefore, such a remote copy operation tends to have a large amount of data transfer compared to the case of handling deduplicated data as the transfer target.

SUMMARY

According to an aspect, there is provided a storage control apparatus including a processor configured to perform a procedure that includes transferring a summary information piece of a copy target data unit stored in a copy-source storage apparatus to a copy-destination storage apparatus; acquiring, from the copy-destination storage apparatus, a checked result obtained by checking the summary information piece against information stored in the copy-destination storage apparatus; and transferring the copy target data unit to the copy-destination storage apparatus when the checked result indicates matching discrepancy.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
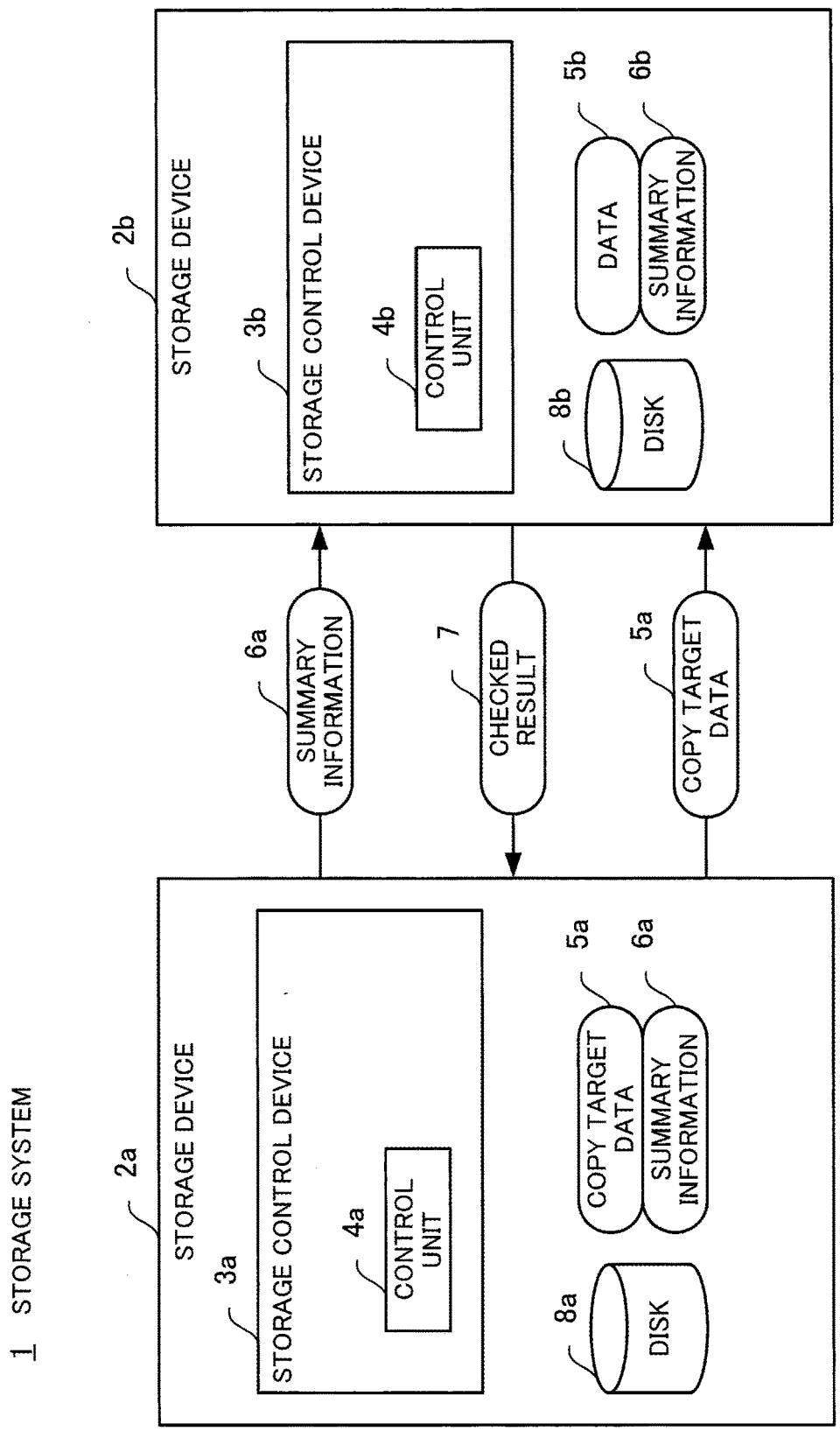
FIG. 1 illustrates an example of a configuration of a storage system according to a first embodiment.

Several embodiments will be described below with reference to the accompanying drawings, wherein like reference numerals refer to like elements throughout.

(a) First Embodiment

First, a storage system according to a first embodiment is explained with reference to FIG. 1. FIG. 1 illustrates an example of the configuration of the storage system according to the first embodiment. A storage system 1 includes a plurality of storage devices 2a and 2b. The storage system 1 is able to copy data from the storage device 2a to the storage device 2b or, in other words, is able to create a remote copy.

In a remote copy operation between the storage devices 2a and 2b, the storage device 2a is a copy-source storage device while the storage device 2b is a copy-destination storage device. The storage device 2a includes a storage control device 3a and one disk 8a or more capable of storing data therein. The storage control device 3a exercises control over the storage device 2a. The storage device 2b also includes a storage control device 3b and one disk 8b or more capable of storing data therein. The storage control device 3b exercises control over the storage device 2b.

The storage control device 3a is a type of information processor, and is, for example, a controller module in the case where the storage device 2a is a RAID device. The storage control device 3a includes a control unit 4a. The control unit 4a is, for example, a processor provided in the controller module, and controls remote copy operations and the like. In like fashion, the storage control device 3b is a type of information processor, and is, for example, a controller module in the case where the storage device 2b is a RAID device. The storage control device 3b includes a control unit 4b. The control unit 4b is, for example, a processor provided in the controller module, and controls remote copy operations and the like.

The control unit 4a transfers summary information 6a on copy target data 5a stored in the storage device 2a from the storage device 2a to the storage device 2b. The summary information 6a is a value uniquely set for the copy target data 5a. The summary information 6a is, for example, a hash value for the copy target data 5a, and is calculated using a hash function. The storage device 2b acquires the summary information 6a. Note that the storage device 2b stores in advance data 5b and summary information 6b in the disk 8b. The summary information 6b is a value uniquely set for the data 5b. The summary information 6b is, for example, a hash value for the data 5b, and is calculated by the same hash function as used in the calculation of the summary information 6a.

The control unit 4b checks the summary information 6a against the summary information 6b. If the summary information 6a matches the summary information 6b, the control unit 4b generates a checked result 7 indicating matching agreement. If the summary information 6a does not match the summary information 6b, the control unit 4b generates the checked result 7 indicating matching discrepancy. The control unit 4b transfers the checked result 7 from the storage device 2b to the storage device 2a.

The storage device 2a acquires the checked result 7. In the case of the checked result 7 indicating matching discrepancy, the control unit 4a transfers the copy target data 5a to the storage device 2b and then completes the remote copy operation. On the other hand, if the checked result 7 indicates matching agreement, i.e., the copy target data 5a is equivalent to the data 5b, the control unit 4a completes the remote copy operation without transferring the copy target data 5a to the storage device 2b.

As described above, the storage control device 3a transfers the copy target data 5a to the storage device 2b only if the storage device 2b does not have the copy target data 5a, i.e., only if the copy target data 5a is not equivalent to the data 5b. As a result, the storage control device 3a is able to reduce the amount of data transfer associated with remote copy operations, thereby improving the efficiency of remote copy execution. In addition, the storage control device 3a is also able to reduce the amount of data transfer in an environment with a deduplication function being in effect, thereby improving the efficiency of remote copy execution. In this manner, the storage system 1 is able to perform remote copy operations while reducing the amount of data transfer from the copy-source storage device to the copy-destination storage device.

(b) Second Embodiment

Figure 2:
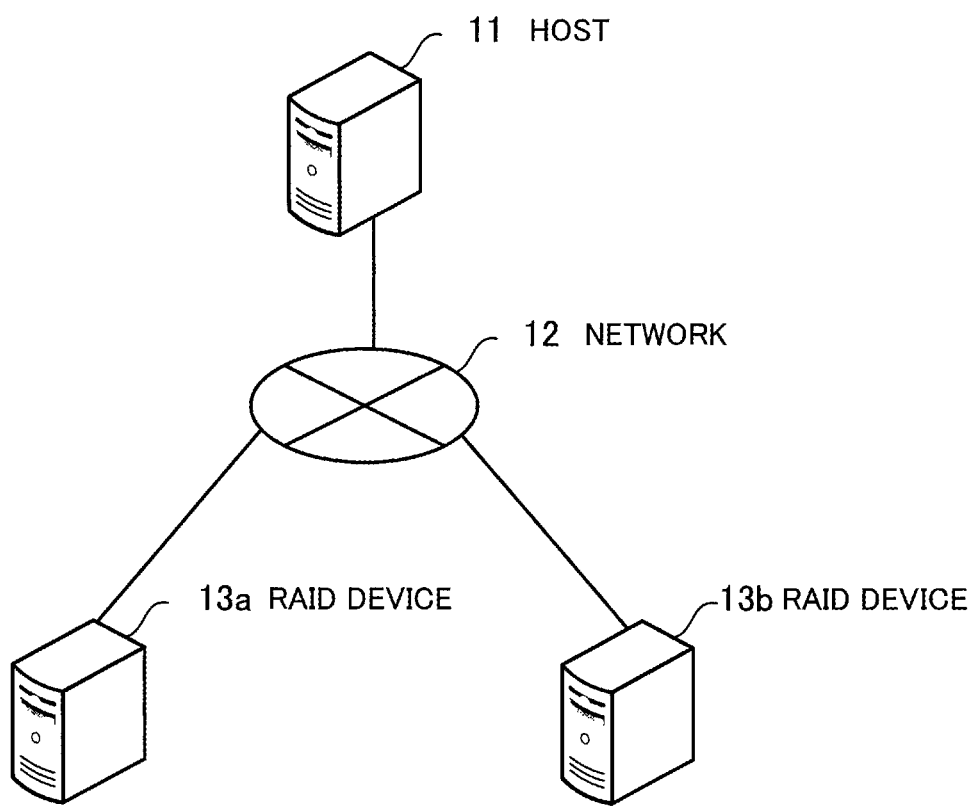
FIG. 2 illustrates an example of a configuration of a storage system according to a second embodiment.

Next described is a storage system according to a second embodiment with reference to FIG. 2. FIG. 2 illustrates an example of the configuration of the storage system according to the second embodiment. A storage system 10 includes a host 11 and RAID devices 13a and 13b connected to the host 11 via a network 12. In the storage system 10, remote copy operations are performed with one of the RAID devices 13a and 13b being a copy-source RAID device and the other being a copy-destination RAID device. For example, the storage system 10 performs the remote copy operations where the RAID device 13a serves as a copy-source RAID device and the RAID device 13b serves as a copy-destination RAID device. Control of executing the remote copy operations is implemented by the RAID devices 13a and 13b. Note that not the RAID devices 13a and 13b but the host 11 may implement control of the remote copy operations.

Figure 3:
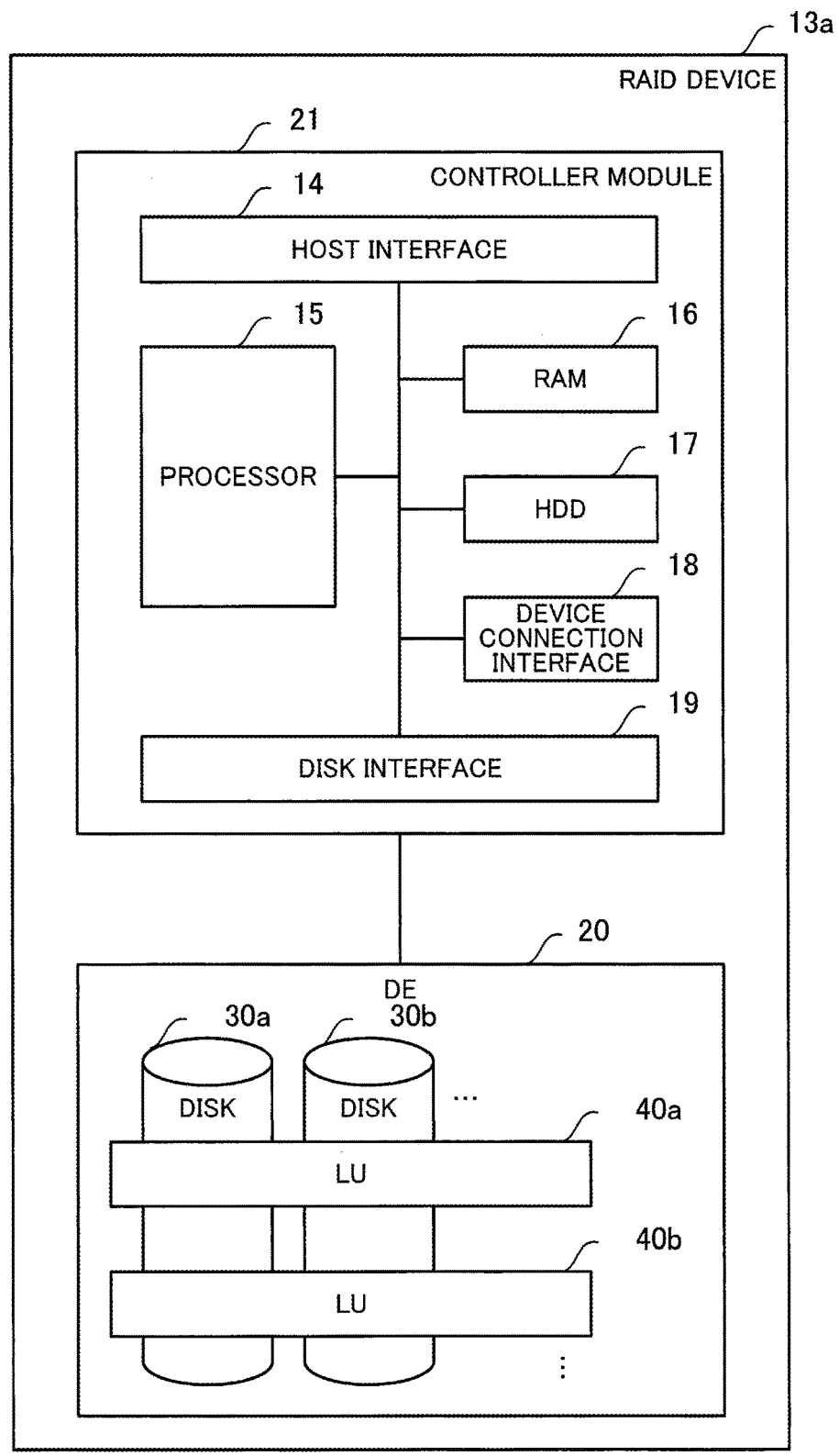
FIG. 3 illustrates an example of a hardware configuration of a RAID device according to the second embodiment.

Next described is a hardware configuration of the RAID device 13a with reference to FIG. 3. FIG. 3 illustrates an example of the hardware configuration of the RAID device according to the second embodiment. The RAID device 13a includes a controller module 21 and a drive enclosure (DE) 20. Note that the RAID device 13a may include a plurality of the controller modules 21 and a plurality of the drive enclosures 20.

The controller module 21 includes a host interface 14, a processor 15, random access memory (RAM) 16, a hard disk drive (HDD) 17, a device connection interface 18, and a disk interface 19. Overall control of the controller module 21 is exercised by the processor 15. To the processor 15, the RAM 16 and a plurality of peripherals are connected via a bus. The processor 15 may be a multi-core processor including two or more processors. Note that if a plurality of the controller modules 21 are provided, a master-slave relationship among the controller modules 21 may be defined, in which the master controller module 21 exercises control over the slave controller modules 21 and the entire RAID device 13a.

The processor 15 is, for example, a central processing unit (CPU), a micro processing unit (MPU), a digital signal processor (DSP), an application specific integrated circuit (ASIC), or a programmable logic device (PLD). The RAM 16 is used as a main storage device of the controller module 21. The RAM 16 temporarily stores at least part of an operating system (OS) program and application programs to be executed by the processor 15. The RAM 16 also stores therein various types of data to be used by the processor 15 for its processing. In addition, the RAM 16 serves as cache memory of the processor 15.

The peripherals connected to the bus include the host interface 14, the HDD 17, the device connection interface 18, and the disk interface 19. The host interface 14 transmits and receives data to and from the host 11 and the RAID device 13b via the network 12. The HDD 17 magnetically writes and reads data to and from a built-in disk, and is used as a secondary storage device of the RAID device 13a. The HDD 17 stores therein the OS program, application programs, and various types of data. Note that a semiconductor storage device such as flash memory may be used as a secondary storage device in place of the HDD 17.

The device connection interface 18 is a communication interface for connecting peripherals to the controller module 21. For example, a memory device and a memory reader/writer (not illustrated) may be connected to the device connection interface 18. The memory device is a storage medium provided with a function of communicating with the device connection interface 18. The memory reader/writer writes and reads data to and from a memory card, which is, for example, a card-type storage medium. In addition, a display unit (not illustrated) may be connected to the device connection interface 18. In that case, the device connection interface 18 has a function of displaying information on the display unit according to an instruction from the processor 15.

In addition, a keyboard and a mouse (not illustrated) may be connected to the device connection interface 18. In that case, the device connection interface 18 transmits signals sent from the keyboard and the mouse to the processor 15. Note that the mouse is just an example of pointing devices, and a different pointing device such as a touch panel, a tablet, a touch-pad, and a track ball, may be used instead. In addition, an optical drive unit (not illustrated) may be connected to the device connection interface 18. The optical drive unit reads data recorded on an optical disk using, for example, laser light. The optical disk is a portable storage medium on which data is recorded in such a manner as to be read by reflection of light. Examples of the optical disk include a digital versatile disc (DVD), a DVD-RAM, a compact disc read only memory (CD-ROM), a CD recordable (CD-R), and a CD-rewritable (CD-RW). The disk interface 19 transmits and receives data to and from the drive enclosure 20. The controller module 21 is connected to the drive enclosure 20 via the disk interface 19.

The drive enclosure 20 houses one or more disks, for example, disks 30a, 30b, and so on. Each of the disks 30a, 30b, and so on is a storage device and stores therein data according to an instruction from the controller module 21. The disks 30a, 30b, and so on are, for example, HDDs or solid state drives (SSDs). One or more logical units (LUs), for example, logical units 40a, 40b, and so on, are logically assigned to the disks 30a, 30b, and so on. Each of the logical units 40a, 40b, and so on is given a logical unit number (LUN) for uniquely identifying the logical unit, and stores each data piece at an address identified by a logical block address (LBA). Therefore, individual data pieces stored in the disks 30a, 30b, and so on are identified by their LUNs and LBAs. Note that the state where the logical units 40a, 40b, and so on are logically assigned to the disks 30a, 30b, and so on is described later with reference to FIG. 4.

The hardware configuration described above achieves the processing functions of the RAID device 13a. The RAID device 13a achieves its processing functions, for example, by executing a program stored in a computer-readable storage medium. The program describing processing content to be implemented by the RAID device 13a may be stored in various types of storage media. For example, the program to be executed by the RAID device 13a may be stored in the HDD 17. The processor 15 loads at least part of the program stored in the HDD 17 into the RAM 16 and then runs the program. In addition, the program to be executed by the RAID device 13a may be stored in a portable storage medium, such as an optical disk, a memory device, and a memory card. The program stored in the portable storage medium becomes executable after being installed on the HDD 17, for example, under the control of the processor 15. Alternatively, the processor 15 may run the program by directly reading it from the portable storage medium. Note that the RAID device 13b has the same hardware configuration as the RAID device 13a, and thus repeated description thereof is omitted.

Figure 4:
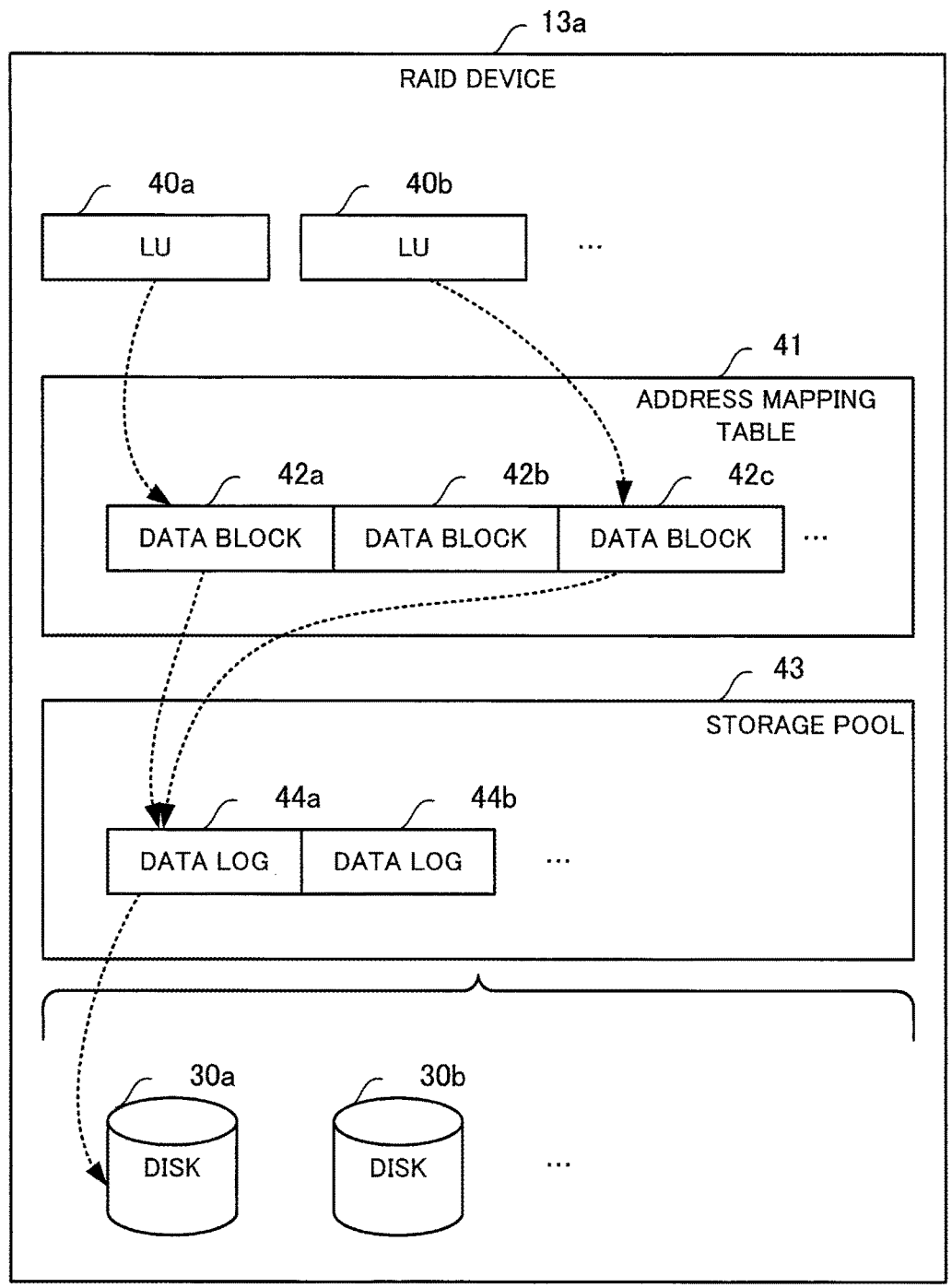
FIG. 4 illustrates an example of an image of a storage pool according to the second embodiment.

Next described is an image of a storage pool according to the second embodiment with reference to FIG. 4. FIG. 4 illustrates an example of the image of the storage pool according to the second embodiment. Here is the description of the state in the RAID device 13a, where the logical units 40a, 40b, and so on are logically assigned to the disks 30a, 30b, and so on. Note that the following description focuses only on the RAID device 13a; however, the same applies to the RAID device 13b. The RAID device 13a includes an address mapping table 41 and a storage pool 43. The storage pool 43 allows the storage areas of the individual disks 30a, 30b, and so on to be logically combined into a single large storage area. The RAID device 13a assigns a logical storage area available from the storage pool 43 to each of the logical units 40a, 40b, and so on. The host 11 accesses the individual logical units 40a, 40b, and so on to thereby read and write data to and from the disks 30a, 30b, and so on.

The address mapping table 41 includes data blocks 42a, 42b, 42c, and so on. The data blocks 42a, 42b, 42c, and so on are information used to convert reference destinations of addresses each identified by a LUN and a LBA. The storage pool 43 includes data logs 44a, 44b, and so on. Each of the data logs 44a and 44b is information representing a reference destination of an address converted by using the data blocks 42a, 42b, 42c, and so on. The data logs 44a, 44b, and so on include data stored in the disks 30a, 30b, and so on and management information for the data.

Now the deduplication function of the RAID device 13a is described. Upon an instruction to write the same data piece as one already stored in the disk 30a, 30b, or so on, the RAID device 13a eliminates data duplication by enabling the stored data piece to be referred to by the reference source instead of writing the data piece. The RAID device 13a achieves the deduplication function by associating the data logs 44a, 44b, and so on one-to-one with data pieces stored in the disks 30a, 30b, and so on (i.e., one-to-one relationship) and associating each of the data logs 44a, 44b, and so on with a plurality of the data blocks 42a, 42b, and 42c (one-to-many relationship).

For example, the data log 44a is associated with a data piece stored in the disk 30a, and also associated with the data blocks 42a and 42c. Herewith, the logical unit 40a (with an LBA specification) is able to specify the data piece in the disk 30a associated with the data log 44a via the data block 42a. In addition, the logical unit 40b (with an LBA specification) is able to specify the same data piece as specified by the logical unit 40a (with an LBA specification) via the data block 42c. Herewith, when the logical unit 40a (with an LBA specification) copies the specified data piece to the logical unit 40b (with an LBA specification), the RAID device 13a only needs to set the reference destination of the data block 42c in the data log 44a. This prevents the storage space of the disks 30a, 30b, and so on from being consumed by the same data piece.

Figure 5:
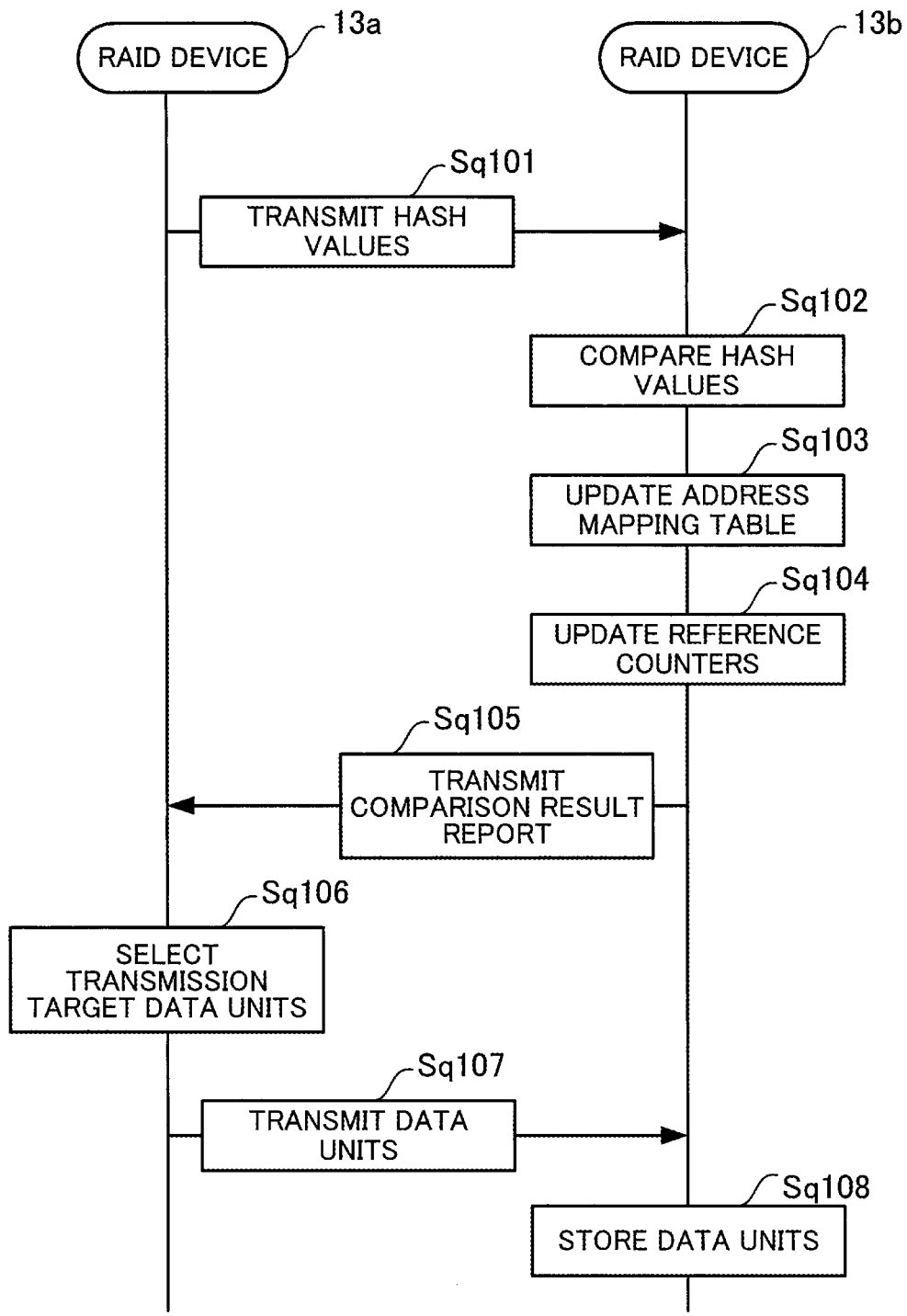
FIG. 5 illustrates an example of a remote copy sequence according to the second embodiment.

Next described is a remote copy sequence according to the second embodiment with reference to FIG. 5. FIG. 5 illustrates an example of the remote copy sequence according to the second embodiment. The following describes a remote copy operation in which the RAID device 13a is a copy-source RAID device and the RAID device 13b is a copy-destination RAID device.

[Sequence Sq101] The RAID device 13a transmits, to the RAID device 13b, one or more hash values of copy target data according to the size of the copy target data. The RAID device 13a calculates one hash value for, of the copy target data, each predetermined data unit (for example, 4 Kbytes). The hash values are obtained by the RAID device 13a using a hash function on the individual data units of the copy target data. Together with the hash values, the RAID device 13a also transmits information (such as LUNs and LBAs) used to identify the individual data units of the copy target data.

[Sequence Sq102] The RAID device 13b compares each of the received hash values against hash values that the RAID device 13b holds in advance. If the received hash value matches one of the hash values held in advance, the RAID device 13b determines that it has already stored a corresponding data unit of the copy target data. On the other hand, if the received hash value does not match any of the hash values held in advance, the RAID device 13b determines that it has yet to store the corresponding data unit of the copy target data.

[Sequence Sq103] As for, among the received hash values, one or more hash values matching those held by the RAID device 13b in advance, the RAID device 13b determines, as reception data, data units already held by the RAID device 13b and corresponding to the matching hash values. The RAID device 13b updates the address mapping table in such a manner that access is allowed to the data units corresponding to the matching hash values according to their LUNs and LBAs (information used to identify the data units of the copy target data).

[Sequence Sq104] Along with the update of the address mapping table, the RAID device 13b updates reference counters corresponding to the data units determined in sequence Sq103. The reference counter is a type of management information included in each data log and indicates the number of reference sources for its corresponding deduplicated data unit. Note that details of the reference counter are described later with reference to FIG. 6A.

[Sequence Sq105] The RAID device 13b transmits, to the RAID device 13a, a comparison result report indicating the result of comparing each of the received hash values against the hash values held by the RAID device 13b in advance. Note that the RAID device 13b is able to add, to the hash-value comparison result report, the information (such as LUNs and LBAs) used to identify the individual data units of the copy target data, received together with the hash values. The RAID device 13b may use, as the hash-value comparison result report, a bitmap in which "match/mismatch" for each of the received hash values is represented by one bit.

[Sequence Sq106] Based on the hash-value comparison result report received from the RAID device 13b, the RAID device 13a selects data units to be transmitted (hereinafter referred to as the "transmission target data units"). The transmission target data units are, of the copy target data, data units each corresponding to a hash value whose comparison result indicates a "mismatch". As for data units each corresponding to a hash value whose comparison result indicates a "match", the RAID device 13a completes the copy operation without transmitting the data units.

[Sequence Sq107] The RAID device 13a transmits the transmission target data units, each of which corresponds to a hash value whose comparison result indicates a "mismatch", to the RAID device 13b. As for the transmission target data units, the RAID device 13a completes the copy operation by transmitting the transmission target data units.

[Sequence Sq108] The RAID device 13b stores the data units received from the RAID device 13a in its storage pool. The RAID device 13b also creates data logs and updates the address mapping table for the stored data units.

Note that processes executed by the RAID device 13a are described later with reference to FIGS. 7 and 8, and processes executed by the RAID device 13b are described later with reference to FIGS. 9 and 10.

As described above, the RAID device 13a transmits only hash values to the RAID device 13b prior to the data transmission. The RAID device 13a receives results of hash value comparison from the RAID device 13b, and transmits only data units with comparison results each indicating a "mismatch" (i.e., the transmission target data units). That is, instead of transmitting all data units of the copy target data, the RAID device 13a designates data units not stored in the RAID device 13b as the transmission target data units. For example, in the case of transferring the same data pattern more than once, the RAID device 13a is able to largely reduce the amount of data transfer in the second and subsequent data transfers.

Herewith, it is possible to reduce the amount of data transfer from the RAID device 13a to the RAID device 13b. As a result, the RAID device 13a reduces load on the network between the RAID devices 13a and 13b. In addition, the RAID device 13a is able to define deduplicated data units as copy targets and, therefore, need not deal with all data in the storage pool 43 as the copy targets. Therefore, the RAID device 13a is able to efficiently perform remote copy operations on the RAID device 13b. As a result, the RAID device 13a with the above-described characteristics improves the efficiency of executing data migration.

Figure 6A:
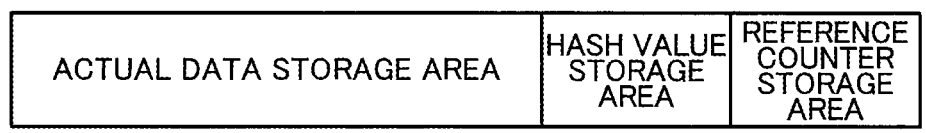
FIG. 6A illustrates an example of a data-log data structure according to the second embodiment.
Figure 6B:
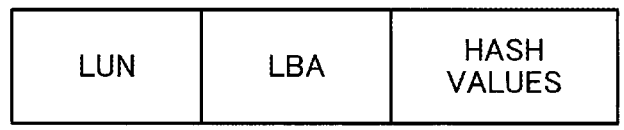
FIG. 6B illustrates an example of a transmission format for hash value transfer.
Figure 6C:
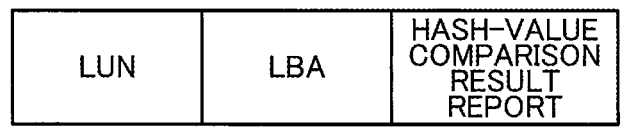
FIG. 6C illustrates an example of a reception format for hash value transfer.

Next described are the data structure of a data log, a transmission format for hash value transfer, and a reception format for hash value transfer according to the second embodiment with reference to FIGS. 6A to 6C. FIG. 6A illustrates an example of the data structure of the data log according to the second embodiment. FIG. 6B illustrates an example of the transmission format for hash value transfer. FIG. 6C illustrates an example of the reception format for hash value transfer.

FIG. 6A illustrates the data structure of each of the data logs 44a, 44b, and so on (hereinafter referred to as "data-log data structure"). The data-log data structure includes an actual data storage area, a hash value storage area, and a reference counter storage area. The actual data storage area is able to store user data and has, for example, a size of 4 Kbytes. The hash value storage area stores a hash value calculated from the data stored in the actual data storage area and has, for example, a size of 20 bytes. Note that the size of the hash value storage area is set as small as to be able to ignore the possibility of the same hash value being calculated from different data. Note that the RAID device 13a may change the size of the hash value storage area according to the size of the storage pool (that is, according to the hash collision probability). The reference counter storage area stores the number of reference sources for the data stored in the actual data storage area and has, for example, a size of 4 bytes.

FIG. 6B illustrates a transmission format used in hash value transfer. The transmission format is a communication format used to transmit the one or more hash values in sequence Sq101 of the remote copy sequence. The transmission format includes transmission information such as LUNs, LBAs, and hash values. For example, the LUNs, LBAs, and hash values are information having a size of 4 bytes, 8 bytes, and 20 bytes, respectively.

FIG. 6C illustrates a reception format used in hash value transfer. The reception format is a communication format used to receive the hash-value comparison result report in sequence Sq105 of the remote copy sequence. The reception format includes reception information such as LUNs, LBAs, and a hash-value comparison result report. For example, the LUNs, LBAs, and hash-value comparison result report are information having a size of 4 bytes, 8 bytes, and 1 byte, respectively. Note that the reception format may include reserve information whose use is not predetermined. For example, the reception format may include the reserve information having a size of 19 bytes to thereby have the same total size, 32 bytes, as the transmission format for hash value transfer.

Figure 7:
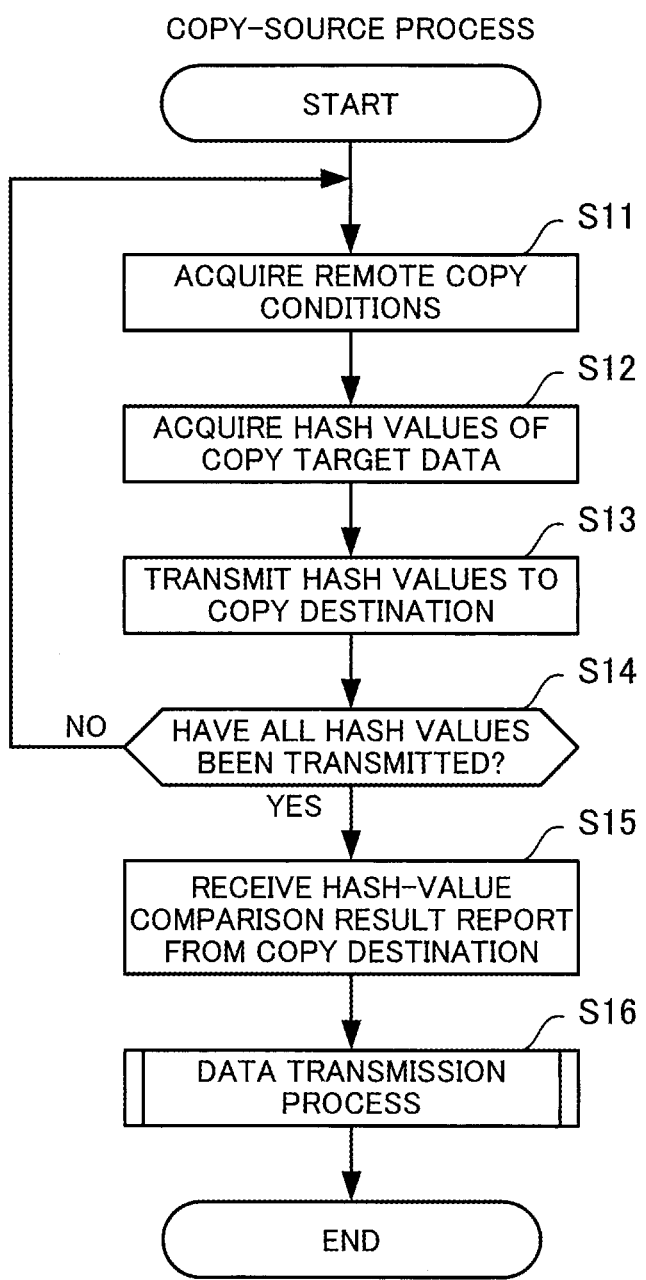
FIG. 7 is a flowchart of a copy-source process according to the second embodiment.

Next described is a process performed by the copy source according to the second embodiment with reference to FIG. 7. FIG. 7 is a flowchart of the copy-source process according to the second embodiment. The copy-source process is for the RAID device 13a (the copy-source RAID device) to perform data transfer based on the results of comparing one or more hash values of the copy target data, transmitted to the RAID device 13b (the copy-destination RAID device), against hash values of data stored in the RAID device 13b. Upon receiving, from the host 11, an instruction to perform a remote copy operation, a control unit (the processor 15) of the RAID device 13a performs the copy-source process.

[Step S11] The control unit acquires remote copy conditions, which are various types of information specifying conditions for executing a remote copy operation. For example, the remote copy conditions include copy target data, a copy source of the data, a copy destination of the data, a copy path and so on as information on the copy target data. Note that the control unit may acquire remote copy conditions stored in the HDD 17, or may acquire them from a command input by a maintenance engineer.

[Step S12] The control unit acquires one or more hash values corresponding to the copy target data. For example, the control unit identifies the data log 44a via the data block 42a corresponding to the copy target data and then acquires, from the data log 44a, its hash value.

[Step S13] The control unit transmits the hash values of the copy target data to the RAID device 13b. Note that, in addition to the hash values, the control unit also transmits LUNs and LBAs of the copy target data according to the communication format illustrated in FIG. 6B.

[Step S14] The control unit determines whether all the hash values of the copy target data have been transmitted to the RAID device 13b. For example, in the case where a data block, which is a unit to calculate one hash value, has a size of 4 Kbytes and the size of the copy target data is 32 Mbytes, the number of hash values of the copy target data is 8192 (=32 M/4 K). The 8192 hash values amount to a size of 256 Kbytes (=32 bytes×8192), and, for example, the RAID device 13a is able to transmit the 8192 hash values (a group of hash values) to the RAID device 13b in one go. Therefore, the RAID device 13a is able to transmit more than 8192 hash values to the RAID device 13b over two or more communication rounds.

If all the hash values have been transmitted, the control unit moves to step S15. If not, the control unit moves to step S11. In the above-described manner, all the hash values are transmitted to the RAID device 13b.

[Step S15] The control unit receives a hash-value comparison result report from the RAID device 13b. In addition to the hash-value comparison result report, the control unit also receives LUNs and LBAs of the copy target data according to the communication format illustrated in FIG. 6C. Note that the received hash-value comparison result report may be a group of comparison results corresponding to the group of hash values transmitted in step S14.

[Step S16] The control unit performs a data transmission process. The data transmission process is for the control unit of the RAID device 13a to transmit one or more data units (data blocks) of the copy target data to the RAID device 13b based on the hash-value comparison result report. Details of the data transmission process are described below with reference to FIG. 8.

Figure 8:
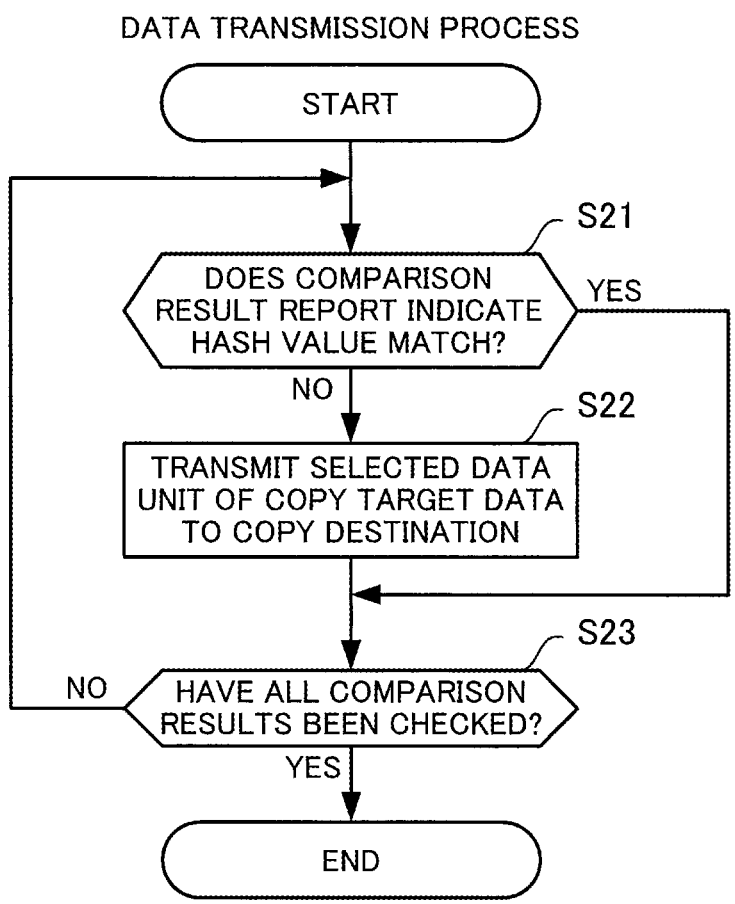
FIG. 8 is a flowchart of a data transmission process according to the second embodiment.

Next described is the data transmission process according to the second embodiment with reference to FIG. 8. FIG. 8 is a flowchart of the data transmission process according to the second embodiment. The data transmission process is a process for the control unit (the processor 15) of the RAID device 13a (the copy-source RAID device) to transmit one or more data units of the copy target data to the RAID device 13b (the copy-destination RAID device) based on the hash-value comparison result report. The data transmission process is executed by the control unit in step S16 of the copy-source process.

[Step S21] The control unit determines whether the hash-value comparison result report received from the RAID device 13b indicates a "match". That is, the control unit determines whether the received comparison result report indicates that a hash value transmitted by the RAID device 13a has matched a hash value of data stored in the RAID device 13b. If the hash-value comparison result report indicates a "match", the control unit moves to step S23. If the hash-value comparison result report does not indicate a "match", i.e., indicates a "mismatch", the control unit moves to step S22. Note that in the case where the hash-value comparison result report received from the RAID device 13b includes comparison results of a plurality of hash values, the control unit makes a matching determination with respect to each of the comparison results.

[Step S22] The control unit selects, as transmission data, a data unit (corresponding to one data block) corresponding to the hash value being a "mismatch", and transmits the selected data unit to the RAID device 13b.

[Step S23] The control unit determines whether a hash-value "match/mismatch" has been checked for each of all the comparison results included in the received hash-value comparison result report. If one or more of the comparison results remain unchecked, the control unit moves back to step S21. If all the comparison results have been checked, the data transmission process ends.

Thus, when a hash-value comparison result (checked result) received from the RAID device 13b indicates a "match", the RAID device 13a skips transmission of a corresponding data unit of the copy target data to the RAID device 13b. Herewith, the RAID device 13a is able to reduce the amount of data transfer to the RAID device 13b.

Figure 9:
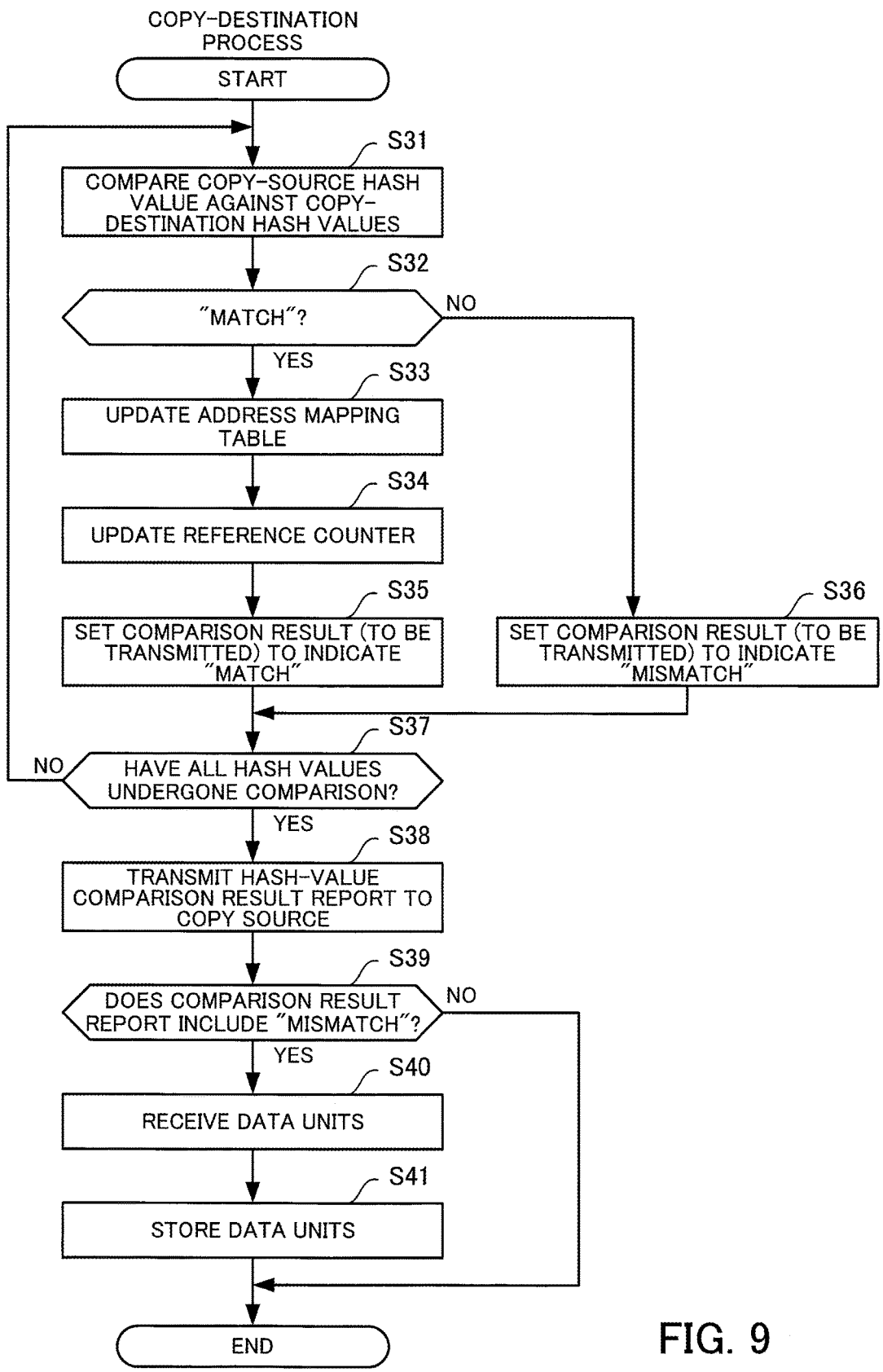
FIG. 9 is a flowchart of a copy-destination process according to the second embodiment.

Next described is a process performed by the copy destination according to the second embodiment with reference to FIG. 9. FIG. 9 is a flowchart of the copy-destination process according to the second embodiment. The copy-destination process is for the RAID device 13b (the copy-destination RAID device) to compare each of one or more hash values received from the RAID device 13a (the copy-source RAID device) against hash values stored in the RAID device 13b and transmit a hash-value comparison result report to the RAID device 13a. Upon receiving one or more hash values from the RAID device 13a, the control unit (the processor 15) of the RAID device 13b starts the copy-destination process.

[Step S31] The control unit compares each of the one or more received hash values against hash values of data stored in the RAID device 13b. For example, the control unit selects one of the received hash values as a search key and searches hash values included in data logs stored in the RAID device 13b. When the search produces a hit, the control unit sets the comparison result for the selected hash value to indicate a "match". On the other hand, when the search produces a miss, the control unit sets the comparison result for the selected hash value to indicate a "mismatch".

[Step S32] The control unit determines whether the comparison result indicates a "match". If the comparison result indicates a "match", the control unit moves to step S33. If the comparison result indicates a "mismatch", the control unit moves to step S36.

[Step S33] The control unit updates the address mapping table in such a manner that a data log including the hash value with the comparison result indicating a "match" is referred to according to the LUN and LBA corresponding to the matching hash value.

[Step S34] The control unit updates the reference counter of the data log referred to according to the LUN and LBA corresponding to the matching hash value by adding 1 to its value. Herewith, the referenced data log records that the number of reference sources has been increased by 1.

[Step S35] The control unit sets a comparison result (to be transmitted) of the selected hash value to indicate a "match". For example, the control unit sets, within the hash-value comparison result report in the communication format of FIG. 6C, a comparison result corresponding to the selected hash value to indicate a "match".

[Step S36] The control unit sets a comparison result (to be transmitted) of the selected hash value to indicate a "mismatch". For example, the control unit sets, within the hash-value comparison result report in the communication format of FIG. 6C, a comparison result corresponding to the selected hash value to indicate a "mismatch". Herewith, the control unit is able to generate transmission data including the comparison result of the selected hash value.

[Step S37] The control unit determines whether the hash-value comparison has been made for all of the received hash values. If all the hash values have undergone the comparison, the control unit moves to step S38. If not, the control unit moves to step S31.

[Step S38] The control unit transmits the transmission data generated in steps S35 and S36 as the hash-value comparison result report to the RAID device 13a.

[Step S39] The control unit determines whether the hash-value comparison result report transmitted to the RAID device 13a includes a "mismatch". If the hash-value comparison result includes a "mismatch", the control unit moves to step S40. If not, the control unit ends the copy-destination process.

[Step S40] The control unit receives, from the RAID device 13a, one or more data units of the copy target data, each corresponding to a hash value with the comparison result indicating a "mismatch".

[Step S41] The control unit stores the data units of the copy target data received from the RAID device 13a and ends the copy-destination process. At this time, the control unit generates data logs and updates the address mapping table as needed basis.

(c) Third Embodiment

The remote copy operation of a third embodiment differs from that of the second embodiment in performing a reduction in the number of hash values to be transmitted from the copy-source RAID device to the copy-destination RAID device. Therefore, the third embodiment adopts a data-log data structure different from that of the second embodiment. Note that the description of the remote copy operation according to the third embodiment focuses on differences from the above-described second embodiment, and a repeated description thereof may be omitted.

Figure 10:
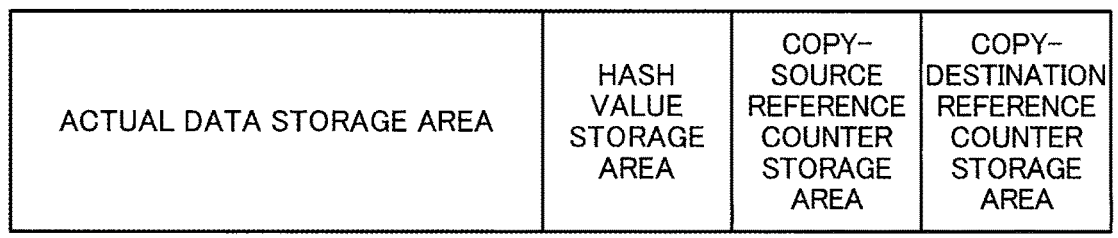
FIG. 10 illustrates an example of the data-log data structure according to a third embodiment.

Next described is the data structure of a data log (data-log data structure) according to the third embodiment with reference to FIG. 10. FIG. 10 illustrates an example of the data-log data structure according to the third embodiment. The data-log data structure includes an actual data storage area, a hash value storage area, a copy-source reference counter storage area, and a copy-destination reference counter storage area. The actual data storage area is able to store user data and has, for example, a size of 4 Kbytes. The hash value storage area stores a hash value calculated from the data stored in the actual data storage area and has, for example, a size of 20 bytes.

The copy-source reference counter storage area stores the number of reference sources for the data stored in the actual data storage area and has, for example, a size of 4 bytes. The copy-source reference counter storage area corresponds to the reference counter storage area of the copy-source RAID device according to the second embodiment. The copy-destination reference counter storage area stores the number of reference sources for the data stored in the actual data storage area in the copy-destination RAID device and has, for example, a size of 4 bytes. The copy-destination reference counter storage area corresponds to the reference counter storage area of the copy-destination RAID device according to the second embodiment.

Note that, by referring to the copy-destination reference counter, the copy-source RAID device is able to estimate whether the copy-destination RAID device stores a data unit corresponding to the copy-destination reference counter. For example, in the case of the copy-destination reference counter having a value of 1 or greater, the copy-source RAID device estimates that the copy-destination RAID device stores the corresponding data unit.

On the other hand, if the copy-destination reference counter has a value of 0, the copy-source RAID device estimates that the copy-source RAID device does not store the corresponding data unit.

Note that in the case where the storage system 10 implements mirroring by operations of remote copy from the RAID device 13a to the RAID device 13b, the value of the copy-destination reference counter is regarded as indicating the number of remote copies. That is, the copy-destination reference counter is considered to indicate history information on data unit transfer from the copy-source RAID device to the copy-destination RAID device.

Figure 11:
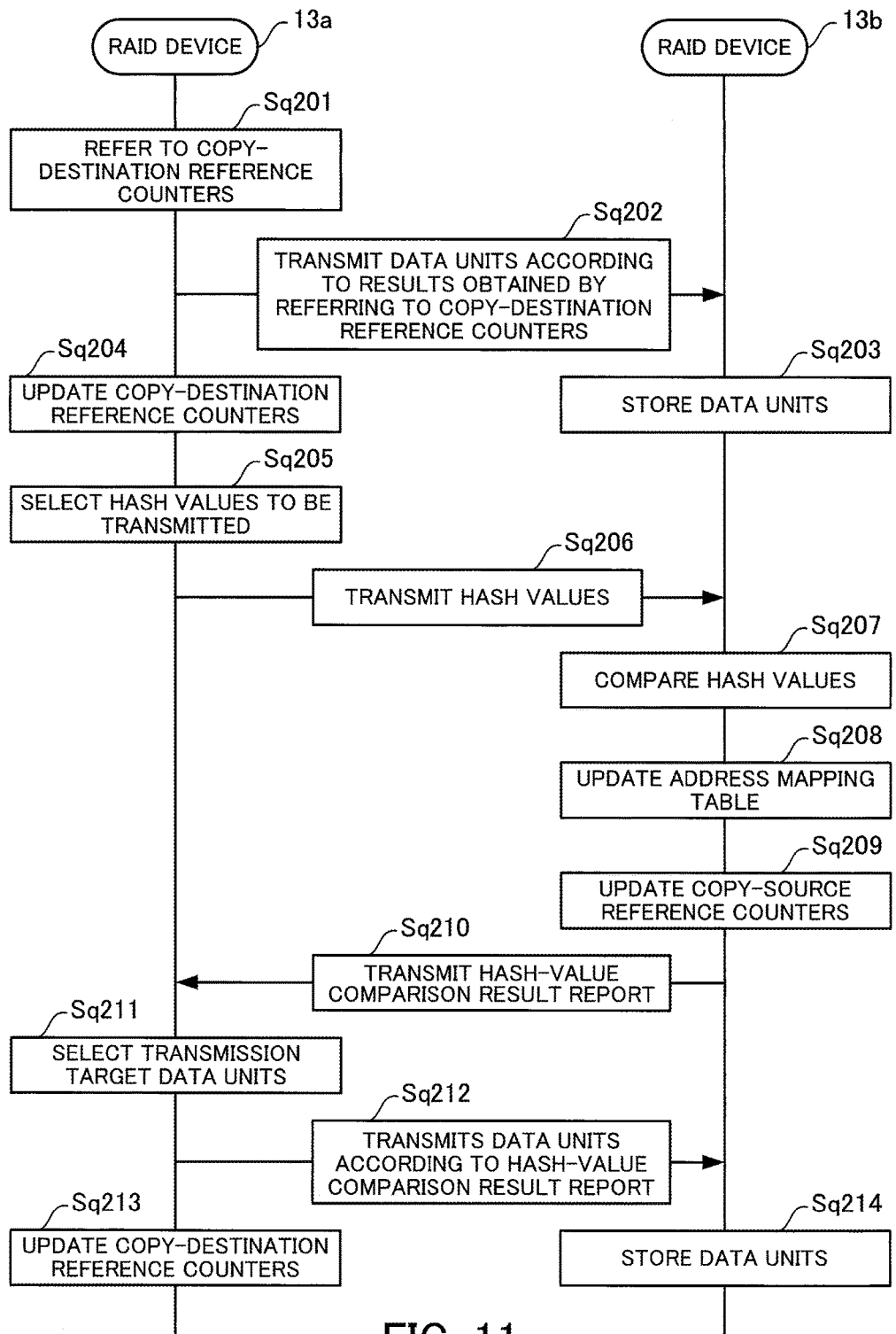
FIG. 11 illustrates an example of a remote copy sequence according to the third embodiment.

Next described is a remote copy sequence according to the third embodiment with reference to FIG. 11. FIG. 11 illustrates an example of the remote copy sequence according to the third embodiment. The following describes a remote copy operation in which the RAID device 13a is a copy-source RAID device and the RAID device 13b is a copy-destination RAID device.

[Sequence Sq201] The RAID device 13a refers to the copy-destination reference counter in each data log corresponding to one or more data units of copy target data.

[Sequence Sq202] If, in each data log, the copy-destination reference counter has a value less than 1, the RAID device 13a transmits the corresponding data unit of the copy target data to the RAID device 13b. That is, the RAID device 13a excludes, from hash values to be transmitted, hash values of data units for which hash matches are unlikely to be found in the RAID device 13b. Herewith, it is possible to prevent an increase in the amount of data transfer due to transferring hash values resulting in hash mismatches.

[Sequence Sq203] The RAID device 13b stores the data units received from the RAID device 13a in the storage pool.

Note that, with respect to each of the stored data units, the RAID device 13b generates a data log and updates the address mapping table.

[Sequence Sq204] The RAID device 13a updates the copy-destination reference counter corresponding to each of the data units transmitted to the RAID device 13b in sequence Sq202 by adding 1 to its value.

[Sequence Sq205] The RAID device 13a selects one or more hash values each corresponding to, of the copy target data, a data unit not transmitted in sequence Sq202. In other words, the RAID device 13a selects one or more hash values each corresponding to a data unit of the copy target data, whose copy-destination reference counter in the data log has a value of 1 or greater.

[Sequence Sq206] The RAID device 13a transmits the selected hash values to the RAID device 13b. Together with the hash values, the RAID device 13a also transmits information (such as LUNs and LBAs) used to identify the corresponding data units of the copy target data.

[Sequence Sq207] The RAID device 13b compares each of the received hash values against hash values that the RAID device 13b holds in advance.

[Sequence Sq208] As for, among the received hash values, one or more hash values matching those held by the RAID device 13b in advance, the RAID device 13b determines, as reception data, data units already held by the RAID device 13b and corresponding to the matching hash values. The RAID device 13b updates the address mapping table in such a manner that access is allowed to the data units corresponding to the matching hash values according to their LUNs and LBAs (information used to identify the data units of the copy target data).

[Sequence Sq209] Along with the update of the address mapping table, the RAID device 13b updates copy-source reference counters corresponding to the data units determined in sequence Sq208.

[Sequence Sq210] The RAID device 13b transmits, to the RAID device 13a, a hash-value comparison result report indicating the result of comparing each of the received hash values against the hash values held by the RAID device 13b in advance.

[Sequence Sq211] Based on the hash-value comparison result report received from the RAID device 13b, the RAID device 13a selects transmission target data units. As for data units each corresponding to a hash value whose comparison result indicates a "match", the RAID device 13a completes the copy operation without transmitting the data units.

[Sequence Sq212] The RAID device 13a transmits the transmission target data units, each of which corresponds to a hash value whose comparison result indicates a "mismatch", to the RAID device 13b. As for the transmission target data units, the RAID device 13a completes the copy operation by transmitting the transmission target data units.

[Sequence Sq213] The RAID device 13a updates the copy-destination reference counter corresponding to each of the data units transmitted to the RAID device 13b in sequence Sq212 by adding 1 to its value.

[Sequence Sq214] The RAID device 13b stores the data units received from the RAID device 13a in the storage pool. The RAID device 13b also creates data logs and updates the address mapping table for the stored data units.

Thus, the RAID device 13a transmits, to the RAID device 13b, hash values for which hash matches are likely to be found in the RAID device 13b. For example, in the case of random data with the same data patterns nearly absent, the RAID device 13b is more likely to fail to find hash matches when all hash values are transmitted to the RAID device 13b. Such hash value transfer resulting in hash mismatches needlessly increases the communication traffic and does not help to reduce the total amount of data transfer. However, because the RAID device 13a according to the third embodiment selects hash values for which hash matches are likely to be found in the RAID device 13b and transmits the selected hash values to the RAID device 13b, it is possible to reduce the total amount of data transfer. Therefore, the RAID device 13a is able to reduce load on the network between the RAID devices 13a and 13b.

Figure 12:
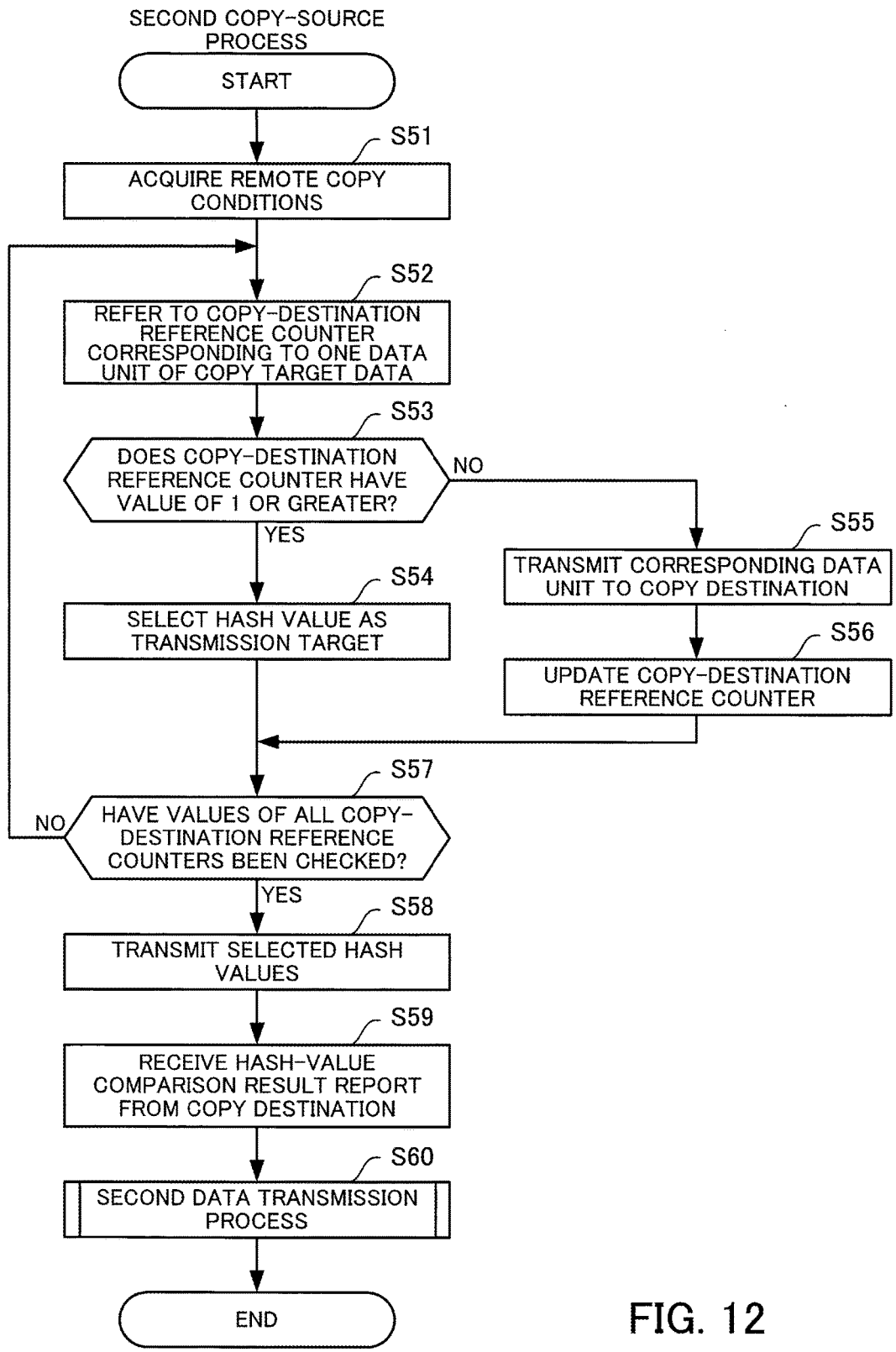
FIG. 12 is a flowchart of a second copy-source process according to the third embodiment.

Next described is a second copy-source process according to the third embodiment with reference to FIG. 12. FIG. 12 is a flowchart of the second copy-source process according to the third embodiment. The second copy-source process corresponds to the copy-source process according to the second embodiment. The second copy-source process differs from the copy-source process according to the second embodiment in including a process associated with copy-destination reference counters.

Upon reception of an instruction to execute a remote copy operation from the host 11, the control unit (the processor 15) of the RAID device 13a performs the second copy-source process. Note that the control unit may set all data units of the copy target data as an execution target of a single-round second copy-source process, or may divide the data units of the copy target data to form execution targets of two or more rounds of the second copy-source process according to conditions such as the size of the copy target data and the processing time.

[Step S51] The control unit acquires remote copy conditions.

[Step S52] The control unit refers to the value of a copy-destination reference counter corresponding to one of the data units of the copy target data.

[Step S53] The control unit determines whether the copy-destination reference counter has a value of 1 or greater. If the copy-destination reference counter has a value of 1 or greater, the control unit moves to step S54. If not, the control unit moves to step S55.

Note that the copy-destination reference counter having a value of 1 or greater suggests that the same data unit of the copy target data is likely to be already present in a data log stored in the copy-destination RAID device. On the other hand, the copy-destination reference counter not having a value of 1 or greater, i.e., having a value of 0, suggests that the same data unit is likely to be absent therefrom.

[Step S54] The control unit selects a hash value corresponding to the copy-destination reference counter as a transmission target.

[Step S55] The control unit transmits the data unit corresponding to the copy-destination reference counter to the RAID device 13b.

[Step S56] The control unit updates the copy-destination reference counter corresponding to the transmitted data unit by adding 1 to its value.

[Step S57] The control unit determines whether it has checked the values of all copy-destination reference counters corresponding to all the data units of the copy target data. If having checked the values of all the copy-destination reference counters, the control unit moves to step S58. If not, the control unit moves to step S52.

[Step S58] The control unit transmits, among hash values corresponding to all the data units of the copy target data, all of one or more hash values selected in step S54 to the RAID device 13b. Note that, together with the hash values, the control unit also transmits the LUNs and LBAs of data units corresponding to the selected hash values according to the communication format illustrated in FIG. 6B.

[Step S59] The control unit receives a hash-value comparison result report from the RAID device 13*b*. Note that, together with the hash-value comparison result report, the control unit receives LUNs and LBAs of the data units corresponding to the hash values according to the communication format illustrated in FIG. 6C.

[Step S60] The control unit performs a second data transmission process. The second data transmission process is for the control unit of the RAID device 13*a* to transmit, to the RAID device 13*b*, data units of the copy target data based on the hash-value comparison result report. Details of the second data transmission process are described below with reference to FIG. 13.

Figure 13:
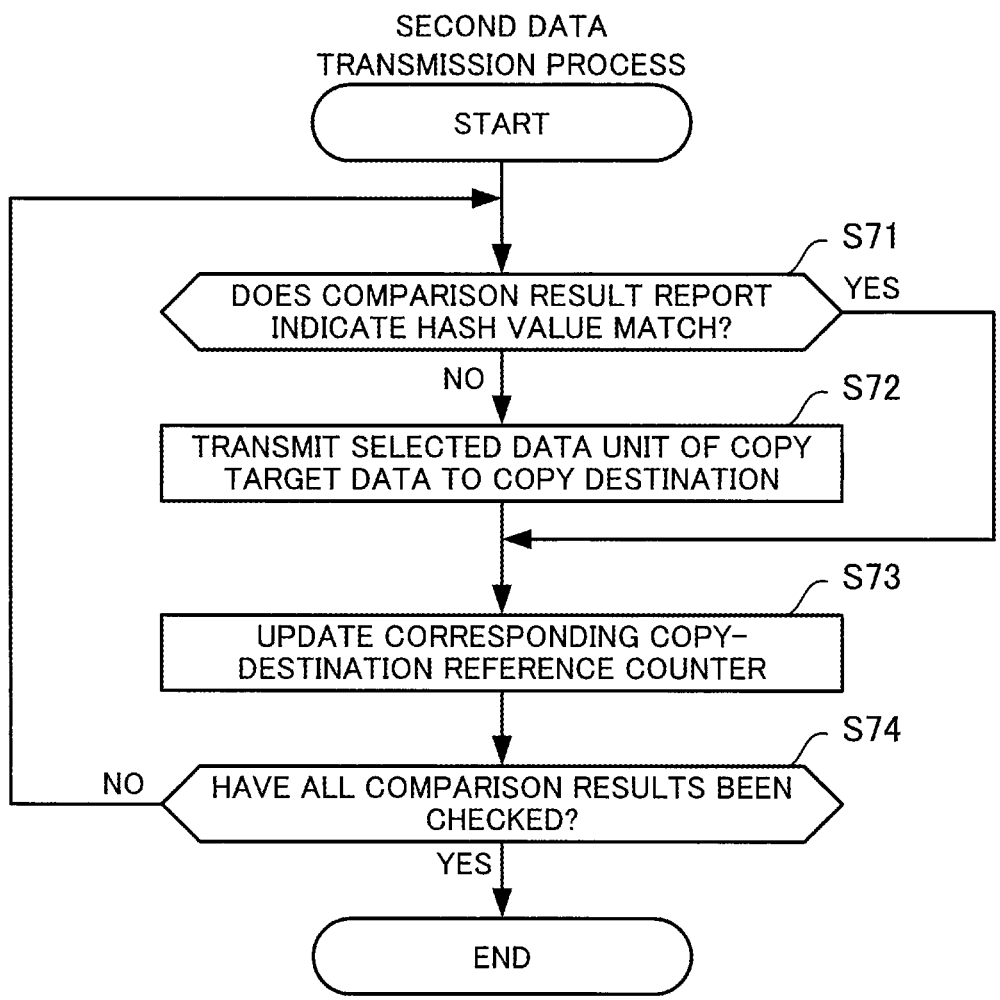
FIG. 13 is a flowchart of a second data transmission process according to the third embodiment.

Next described is the second data transmission process according to the third embodiment with reference to FIG. 13. FIG. 13 is a flowchart of the second data transmission process according to the third embodiment. The second data transmission process is for the control unit (the processor 15) of the RAID device 13*a* (the copy-source RAID device) to transmit, to the RAID device 13*b* (the copy-destination RAID device), one or more data units of the copy target data based on the hash-value comparison result report. The second data transmission process is executed by the control unit in step S60 in the second copy-source process.

[Step S71] The control unit determines whether the hash-value comparison result report received from the RAID device 13*b* indicates a "match". That is, the control unit determines whether the received comparison result report indicates that a hash value transmitted by the RAID device 13*a* has matched a hash value of data stored in the RAID device 13*b*. If the hash-value comparison result report indicates a "match", the control unit moves to step S73. If the hash-value comparison result report does not indicate a "match", i.e., indicates a "mismatch", the control unit moves to step S72. Note that in the case where the hash-value comparison result report received from the RAID device 13*b* includes comparison results of a plurality of hash values, the control unit makes a matching determination with respect to each of the comparison results.

[Step S72] The control unit selects, as transmission data, a data unit (corresponding to one data block) corresponding to the hash value being a "mismatch", and transmits the selected data unit to the RAID device 13*b*.

[Step S73] The control unit updates the copy-destination reference counter corresponding to the transmitted data unit by adding 1 to its value.

[Step S74] The control unit determines whether a hash-value "match/mismatch" has been checked for each of all the comparison results included in the received hash-value comparison result report. If one or more of the comparison results remain unchecked, the control unit moves back to step S71. If all the comparison results have been checked, the second data transmission process ends.

Note that in the case where a write request (WRITE I/O) is received from the host 11 and then a change is made to the value of the copy-source reference counter corresponding to a write target data unit, the RAID device 13*a* (the copy-source RAID device) also updates the value of the corresponding copy-destination reference counter. For example, when the number of references of the target data unit is decreased by 1 due to the write request, the RAID device 13*a* updates each of the copy-source reference counter and the copy-destination reference counter by subtracting 1 from its value. Herewith, even if write requests are issued by the host 11, the RAID device 13*a* is able to select appropriate hash values to be transmitted to the copy-destination RAID device in remote copy operations.

Note that inconsistency may occur between copy-destination reference counters of the copy-source RAID device and corresponding copy-source reference counters of the copy-destination RAID device. However, such inconsistency may be resolved by establishing mirroring by a remote copy operation between the copy-source RAID device and the copy-destination RAID device.

(d) Fourth Embodiment

The remote copy operation of a fourth embodiment differs from that of the third embodiment in including a process of periodically or irregularly synchronizing copy-destination reference counters of the copy-source RAID device and corresponding copy-source reference counters of the copy-destination RAID device. Note that the description of the remote copy operation according to the fourth embodiment focuses on differences from the above-described third embodiment, and a repeated description thereof may be omitted.

In a state where mirroring between the copy-source RAID device and the copy-destination RAID device has been established, each copy-destination reference counter of the copy-source RAID device and its corresponding copy-source reference counter of the copy-destination RAID device take the same value in principle. Herewith, the copy-source RAID device is able to select appropriate hash values to be transmitted to the copy-destination RAID device in remote copy operations. However, in a state where mirroring between the copy-source RAID device and the copy-destination RAID device is suspended, individual copy-destination reference counters of the copy-source RAID device and their corresponding copy-source reference counters of the copy-destination RAID device may take different values. In view of this, the copy-source RAID device performs a resynchronization process periodically or irregularly.

Figure 14:
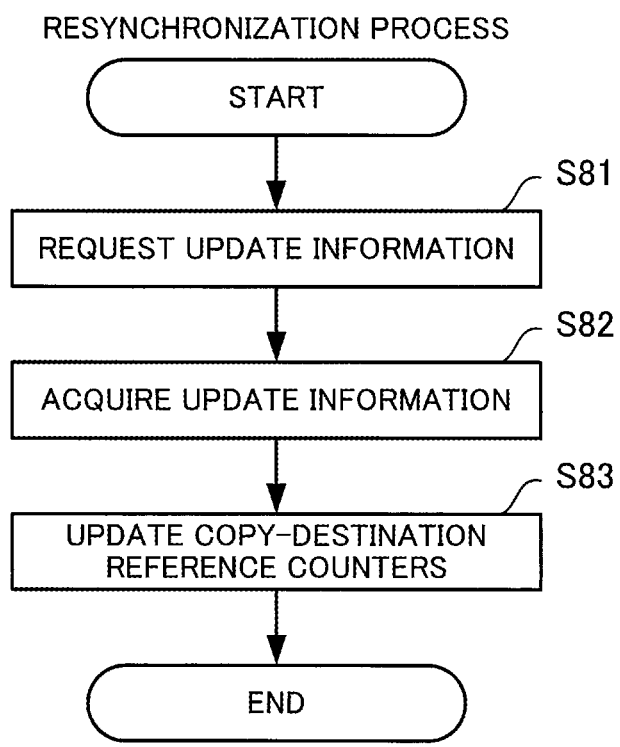
FIG. 14 is a flowchart of a resynchronization process according to a fourth embodiment.

The resynchronization process is described with reference to FIG. 14. FIG. 14 is a flowchart of the resynchronization process according to the fourth embodiment. The resynchronization process is for the control unit (the processor 15) of the RAID device 13*a* (the copy-source RAID device) to synchronize each copy-destination reference counter of the copy-source RAID device and its corresponding copy-source reference counter of the copy-destination RAID device. The resynchronization process is executed by the control unit periodically or irregularly in response to the establishment of predetermined execution conditions. As for the predetermined execution conditions, a periodical execution is triggered, for example, when a preset time on a timer has elapsed or according to schedule. On the other hand, an irregular execution is triggered, for example, upon receiving a synchronization instruction from the host 11 or by the detection of the hash hit rate falling to or below a predetermined threshold.

[Step S81] The control unit requests update information from the RAID device 13*b* (the copy-destination RAID device). Upon receiving the update information request, the RAID device 13*b* generates the update information and returns the update information to the RAID device 13*a*.

Note that the update information includes information indicating data storage locations (logical addresses, physical addresses, and so on) and information indicating data update status (i.e., whether data updates have taken place). The update information is, for example, data in bitmap format representing, for a predetermined data range, the update status with respect to each block of a predetermined size (i.e., whether the block has been updated or not).

[Step S82] The control unit acquires the update information from the RAID device 13*b*.

[Step S83] The control unit updates appropriate copy-destination reference counters based on the acquired update information. For example, based on the update information, the control unit identifies, within the RAID device 13*a*, data logs each corresponding to a part having undergone an update in the RAID device 13 and updates (or corrects) each of the copy-destination reference counters corresponding to the data logs by subtracting 1 from its value. After updating the copy-destination reference counters, the control unit ends the resynchronization process.

Herewith, the control unit is able to prevent a decrease in the efficiency of the communication traffic reduction during a remote copy operation in a state where mirroring between the copy-source RAID device and the copy-destination RAID device is suspended.

The processing functions described in each of the embodiments above may be achieved by a computer. In this case, a program is provided which describes processing contents of the functions to be implemented by each of the storage control devices 3*a* and 3*b* and the RAID devices 13*a* and 13*b*. By executing the program on the computer, the above-described processing functions are achieved on the computer. The program in which the processing contents are described may be recorded on computer-readable storage media. Such computer-readable storage media include a magnetic storage device, an optical disk, a magneto-optical storage medium, and semiconductor memory. Examples of the magnetic storage device are a HDD, a flexible disk (FD), and a magnetic tape. Examples of the optical disk are a DVD, a DVD-RAM, a CD-ROM, and a CD-RW. An example of the magneto-optical storage medium is a magneto-optical disk (MO).

To distribute the program, for example, portable storage media, such as DVDs and CD-ROMs, on which the program is recorded are sold. In addition, the program may be stored in a storage device of a server computer and then transferred from the server computer to another computer via a network. A computer for executing the program stores, for example, in its own storage device, the program which is originally recorded on a portable storage medium or transferred from the server computer. Subsequently, the computer reads the program from its own storage device and performs processing according to the program. Note that the computer is able to read the program directly from the portable storage medium and perform processing according to the program. In addition, the computer is able to sequentially perform processing according to a received program each time such a program is transferred from a server computer. In addition, at least part of the above-described processing functions may be achieved by an electronic circuit, such as a DSP, an ASIC, and a PLD.

According to one aspect, it is possible to perform a remote copy operation while reducing the amount of data transfer from the copy-source storage device to the copy-destination storage device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus comprising:
   a memory configured to store a copy-source reference count value and a copy-destination reference count value, the copy-source reference count value representing a number of reference sources for a copy target data unit stored in a copy-source storage apparatus, the copy-destination reference count value representing a number of reference sources in a copy-destination storage apparatus for a copy of the copy target data unit copied from the copy-source storage apparatus to the copy-destination storage apparatus; and
   a processor configured to perform a procedure including:
      transferring, when the copy-destination reference count value is one or more, a summary information piece of the copy target data unit to the copy-destination storage apparatus,
      transferring, when the copy-destination reference count value is zero, the copy target data unit to the copy-destination storage apparatus without transferring the summary information piece for the copy target data unit to the copy-destination storage apparatus,
      acquiring, from the copy-destination storage apparatus, a checked result obtained by checking the summary information piece against information stored in the copy-destination storage apparatus, and
      transferring the copy target data unit to the copy-destination storage apparatus when the checked result indicates matching discrepancy.

2. The storage control apparatus according to claim 1, wherein:
   the procedure further includes completing, when the checked result indicates matching agreement, a copy operation of the copy target data unit without transferring the copy target data unit to the copy-destination storage apparatus.

3. The storage control apparatus according to claim 1, wherein:
   the procedure further includes:
      transferring, to the copy-destination storage apparatus, a summary information group including the summary information piece in plurality corresponding one-to-one with the copy target data unit in plurality, and
      acquiring, from the copy-destination storage apparatus, a checked result group including the checked result in plurality each associated with one of the summary information pieces.

4. The storage control apparatus according to claim 1, wherein the procedure further includes acquiring update information on one or more updates made to the information stored in the copy-destination storage apparatus and correcting the copy-destination reference count value.

5. The storage control apparatus according to claim 1, wherein the procedure further includes adding one to the copy-destination reference count value corresponding to the copy target data unit, after the copy target data unit is transferred to the copy-destination storage apparatus when the copy-destination reference count value is zero or when the checked result indicates matching discrepancy.

6. The storage control apparatus according to claim 5, wherein the procedure further includes subtracting one from the copy-destination reference count value corresponding to the copy target data unit, when the number of reference sources for the target data unit is decreased by one due to a write request received from a host.

7. The storage control apparatus according to claim 1, wherein:
   the copy-source reference count value represents the number of reference sources for the copy target data unit stored in an actual data storage area in the copy-source storage apparatus; and
   the copy-destination reference count value indicates history information on data transfer from the copy-source storage apparatus to the copy-destination storage apparatus.

8. A non-transitory computer-readable storage medium storing a storage control program that causes a computer to execute a procedure comprising:
   storing a copy-source reference count value and a copy-destination reference count value in a memory, the copy-source reference count value representing a number of reference sources for a copy target data unit stored in the computer, the copy-destination reference count value representing a number of reference sources in a storage apparatus for a copy of the copy target data unit copied from the computer to the storage apparatus;
   transferring, when the copy-destination reference count value is one or more, a summary information piece of the copy target data unit to the storage apparatus;
   transferring, when the copy-destination reference count value is zero, the copy target data unit to the storage apparatus without transferring the summary information piece for the copy target data unit to the storage apparatus;
   acquiring, from the storage apparatus, a checked result obtained by checking the summary information piece against information stored in the storage apparatus; and
   transferring the copy target data unit to the storage apparatus when the checked result indicates matching discrepancy.

9. A storage system comprising:
   a first storage apparatus including a memory and a first processor; and
   a second storage apparatus including a second processor,
   the first processor performs a first procedure including:
      storing a copy-source reference count value and a copy-destination reference count value in the memory, the copy-source reference count value representing a number of reference sources for a copy target data unit stored in the first storage apparatus, the copy-destination reference count value representing a number of reference sources in the second storage apparatus for a copy of the copy target data unit copied from the first storage apparatus to the second storage apparatus,
      transferring, when the copy-destination reference count value is one or more, a summary information piece of the copy target data unit to the second storage apparatus,
      transferring, when the copy-destination reference count value is zero, the copy target data unit to the second storage apparatus without transferring the summary information piece for the copy target data unit to the second storage apparatus,
      acquiring, from the second storage apparatus, a checked result that the second storage apparatus transfers in response to the summary information piece, and
      transferring the copy target data unit to the second storage apparatus when the checked result indicates matching discrepancy, and
   the second processor performs a second procedure including:
      receiving the summary information piece from the first storage apparatus,
      checking the received summary information piece against information stored in the second storage apparatus, and
      transferring a result obtained by the checking to the first storage apparatus.

10. The storage system according to claim 9, wherein:
    the first procedure performed by the first processor further includes completing, when the result indicates matching agreement, a remote copy operation of the copy target data unit without transferring the copy target data unit to the second storage apparatus, and
    the second procedure performed by the second processor further includes allowing, when the result indicates matching agreement, a data unit corresponding to the summary information piece to be accessed as the copy target data unit.

* * * * *